United States Patent [19]

Tanaka et al.

[11] Patent Number: 4,927,710

[45] Date of Patent: May 22, 1990

[54] MATTING AGENT

[75] Inventors: Koji Tanaka; Minoru Ueda; Taizo Masuda, all of Okayama, Japan

[73] Assignee: Japan Exlan Company Limited, Osaka, Japan

[21] Appl. No.: 333,582

[22] Filed: Apr. 5, 1989

[30] Foreign Application Priority Data

Apr. 21, 1988 [JP] Japan .................................. 63-99675
Nov. 10, 1988 [JP] Japan ................................. 63-284897
Jan. 23, 1989 [JP] Japan .................................. 64-14543

[51] Int. Cl.$^5$ .......................................... B32B 27/02
[52] U.S. Cl. .................................... 428/394; 428/397; 428/401; 430/950; 524/565; 526/341
[58] Field of Search ................. 524/565; 428/401, 397, 428/394; 526/341; 430/950

[56] References Cited

U.S. PATENT DOCUMENTS

| | | | |
|---|---|---|---|
| 4,137,380 | 1/1979 | Gunning et al. | 521/62 |
| 4,283,479 | 8/1981 | Hamaoka et al. | 430/264 |
| 4,427,768 | 1/1984 | Kitatani et al. | 430/623 |

*Primary Examiner*—Joseph L. Schofer
*Assistant Examiner*—John J. Guarriello
*Attorney, Agent, or Firm*—Wenderoth, Lind & Ponack

[57] ABSTRACT

Acrylic fibers of extremely short length suitable as a matting agent for paint, etc. The fibers are produced from a polymer containing more than 50 weight % acrylonitrile, the fiber diameter is less than 100μ and the fiber length is less than 3 mm.

5 Claims, No Drawings

MATTING AGENT

BACKGROUND OF THE INVENTION

1. Field of the Invention

The present invention relates to a matting agent suitable for paint, etc.

2. Description of the Prior Art

In recent years, consumers' liking for paint has become diversified, and as a tendency to this, preference is now given to painted films of medium or low luster or subdued color over those to highly lustrous color.

Up to this time, in order to impart a matting effect to paints. various solid additives have been added to paints as a matting agent. For example, there have been employed inorganic pigments, typical of which are calcium carbonate and silicon compounds, and inorganic materials such as glass fibers. However, painted films to which solid additives are added are flat and short of massive feel, and are poor in design effect. Moreover, in respect to the properties of the painted film, the hardness of the painted film becomes high by mixing inorganic material, and when the particle diameter of the inorganic material is larger than about 10 $\mu$, there occurs a tendency to lower the resistance to abrasion and the resistance to damage, on account of brittleness which is a characteristic of the inorganic material itself. Furthermore, because of the low adhesiveness of the inorganic material, which is a matting agent, to the organic matrix resin, and further because the inorganic material itself is not ductile, the processability of the painted film is lowered.

To remedy such shortcomings, a method is proposed which uses particles of a thermoplastic organic polymer such as polyethylene, polypropylene, polyester, etc. But these matting agents are poor in adhesiveness to paints and in resistance to solvents, and when melted, the matting effect is decreased. On the other hand, among organic polymer particles, acrylonitrile (hereinafter referred to as AN) polymer particles in particular, have various favorable properties such as excellent resistance to and weathering, resistance to solvents, and hence are desirable as a matting agent. But the AN polymer particles obtained by the usual polymerization methods such as aqueous precipitation polymerization, melt polymerization, and bulk polymerization, are irregular in shape and size, or porous. Consequently, it has been difficult to obtain an even painted surface from paints to which these AN polymer particles have been added.

To solve such problems, in Japanese Patent Kokai (Laid-open) Nos. 106269/1980 and 126863/1982 for example, methods have been proposed wherein AN polymers of uniform particle shape and size are used. By such methods, the matting effect can be improved, but the production of such AN polymer globular particles involves complicated operations and process steps.

Under such circumstances, we eagerly carried out research, as a a result, we found that by using AN fibers of extremely short fiber lengths as a matting agent, it is possible to provide a matting agent which has not difficulties in production, is excellent in design effect, and can exhibit resistance to weathering, resistance to solvents and good adhesiveness. This finding led to the present invention.

The object of the present invention is therefore to provide a matting agent in an industrially advantageous manner which is excellent in design effect, resistance to weathering, resistance to solvents, and adhesiveness, and is free from problems in practical use.

SUMMARY OF THE INVENTION

The above-mentioned object of the present invention is attained by acrylic fibers composed of a polymer containing more than 50 weight % AN, the diameter of which fibers is less than 100 $\mu$, and the length of which is less than 3 mm.

In particular, the acrylic fibers containing functional groups having active hydrogen, are further improved in adhesiveness to the matrix resin of the paint, and fibers of a length less than 0.3 mm and having an aspect ratio (L/D wherein L is fiber length and D is fiber diameter) less than 20, do not cause stripe scratches and speckled unevenness in painted films.

DETAILED DESCRIPTION OF THE INVENTION

In the following, the present invention will be explained in more detail.

It is necessary that the acrylic fibers used in the present invention should be composed of a polymer containing AN in an amount more than 50 weight %. When the content is lower than this lower limit, the paint will not have a satisfactory resistance to solvents and resistance to weathering, and consequently the matting effect, i.e. the expected object is not attained. The fiber diameter of the fibers, which is determined depending on the thickness of the painted film is required to be less than 100 $\mu$, preferably less than 40 $\mu$. It is necessary that the fiber length be less than 3 mm, preferably less than 1 mm. When the fiber diameter and fiber length exceed these upper limits, the dispersion of the fibers into paints and the painted film can not become uniform, and therefore the expected object is not attained.

It is desirable that the acrylic fibers should contain at least one functional group having active hydrogen, for example, carboxyl group, amido group, amino group, sulfonic acid group, sulfuric acid group, etc. By the introduction of such a functional group, the adhesiveness of the fibers to the matrix resin of the paint is improved. It is desirable that the content of such a functional group should be within the range of 0.2 to 10%, preferably 0.5 to 5%, based on the weight of the acrylic fibers. When the content is below the lower limit, the improvement effect in adhesiveness will be small, and when it exceeds the upper limit, the water-resistance of the painted film will become low.

Methods of introduction of such a functional group are not limited, and a known method such as copolymerization of a monomer containing a desired functional group, introduction of such a functional group as a catalyst terminal, modification (hydrolysis, reduction, etc.) of the acrylic fibers, etc. may be suitably employed, or some of these methods may be combined.

With regard to the cross-sectional shape of the acrylic fibers, any shape may be selected from circular or non-circular shapes such as flat shape, cocoon shape, triangular shape, square shape, Y-shape, cross shape, U-shaped, etc. But in respect of a better design effect (twinkling effect) of the painted film, flat shape, cocoon shape and triangular shape are particularly desirable.

The fibers used in the present invention may be those previously dyed by the usual dyeing method, the gel dyeing method, the spun-dyeing method, etc. By using such dyed fibers, it is possible to get rid of the so-called "dull white" which is a shortcoming seen in the conventional matting agent.

The method of producing such a matting agent is not limited as far as it is possible to obtain fibers satisfying the desired AN content, fiber diameter, fiber length, etc. and such fibers can be obtained by cutting acrylic fiber of short fibers or long fibers of which the AN content and the fiber diameter are in the desired range, into the desired fiber length. In the case of the introduction of functional groups by the modification of the acrylic fibers, the operation may be conducted either before cutting or after cutting. It is important to pay attention so that any fusion among filaments may not occur, (By "fusion" is meant that a plurality of filaments stick together at the cut surfaces by the pressure at the time of cutting.) If any fusion occurs, the fluidity of the paint will decrease and hence it is impossible to obtain uniformly painted films.

To improve the dispersability of the fibers into paints, it is desirable to apply an oiling agent to the fiber surface. The kind of oiling agent can not be determined definitely because it is necessary to change it depending on the kind of the matrix resin in the paint, the disperse medium or the solvent. But, it is desirable to use, for aqueous paints, hydrophilic oiling agent of nonionic, anionic, or cationic type, and for non-aqueous paints, hydrophobic oiling agents such as those of fluorine or silicon type. The quantity of oiling agent to be applied is generally in the range of 0.1 to 3%, based on the weight of the fibers. The order of the application of oiling agent may be either before or after cutting the fibers into extremely short fiber lengths. However, in view of the case of operation and to avoid fusion among filaments upon cutting, it is desirable to apply it before cutting.

For a further improvement of the adhesiveness and the painting operability in particular, the fiber length is desirable to be less than 0.5 mm, preferably less than 0.3 mm. To obtain such fibers, acrylic fibers after a stretching process for example, are shrunk after being cut. When the length exceeds the upper limit of this range, the fibers will be caught in the bar coater upon the roll coating operation, and give rise to stripe scratches, strip unevenness of speckled unevenness on the painted film, thus causing troubles in the painting operation.

The aspect ratio of the fibers is desirably less than 20, preferably from 1 to 15. When the ratio is outside this range, the fibers will bend at the bar coater part, and bring about stripe scratches, stripe unevenness or speckled unevenness on the painted film, thus causing troubles in the painting operation.

The above-mentioned stretching process may be any known stretching process, for example, by boiling water, wet heat, dry heat, etc. which is suitably employed in the production of fibers. When the temperature in the stretching process is too high, the shrinkage will be decreased, and therefore it is desirable to carry out stretching generally between 80° to 150° C.

Before this stretching process, the fibers may be shrunk by a known or widely known drying-compacting treatment and/or a relaxing heat treatment and then subjected to a secondary stretching process. By subjecting the fibers to the relaxing heat treatment in particular, the fibers shrink well in the shrinking process after being cut, and hence this treatment is particularly favorable. In this treatment, by subjecting the fibers to a high temperature in the range in which the fibers do not show any change in shape (generally lower than 140° C.), the fibers will shrink well in the following shrinking process, and therefore this treatment is desirable.

To shrink the fibers after being cut, it is industrially advantageous to employ a treatment in boiling water or a treatment in steam by an autoclave, etc. The temperature at the time of shrinkage is suitably determined depending on the desired degree of shrinkage. But when the temperature exceeds 140° C., it is generally difficult to retain fiber shape, and therefore such a temperature is not desirable.

Depending on the final use of the paint, there are cases where functions such as flame retardancy, non-flammability, antistaticity, electroconductivity, hydroscopicity, water-absorbancy, etc. are demanded. In such cases, it is possible to suitably use, as the matting agent, acrylic fibers which combine the above-mentioned characteristics with these functions.

To add the matting agent of the present invention to paints, various usual methods are employed, for example, a method wherein the matting agent is added and kneaded with the paint in the production process of the paint, a method wherein the matting agent is previously dispersed in a paint diluent, and this paint diluent is then added to the paint, etc.

At this time, it is desirable that the mixing ratio of the matting agent to the paint is in the range of 1 to 50 weight %, preferably 2 to 30 weight %, based on the net weight of the paint. When the ratio is below the lower limit of this range, the paint can not show a sufficient matting effect, and when it exceeds the upper limit, the matting agent can not be dispersed uniformly in the paint, and consequently the expected object can be not be attained.

There is no restriction on the kind of the paint to which the matting agent is added, and for example, non-aqueous or aqueous paints of the acrylic, melamine-alkyd, epoxy, phenol, polyester, silicon-acrylic, or vinyl, etc. type are employed.

It is an effect worthy of special mention of the present invention that the invention can provide a matting agent which is excellent in resistance to weathering, resistance to solvents, adhesiveness, dispersibility into paints, painting operability, and excellent in design effect having a massive feeling, in an industrially advantageous manner without requiring any special apparatus and complicated operations.

EXAMPLES OF THE PRACTICE OF THE INVENTION

In the following, the present invention will be explained in further detail by Examples, but the invention is not limited for its extent by the description of these Examples. In the Examples percentages are by weight unless otherwise indicated.

The resistance to solvents, luster, resistance to weathering, adhesiveness, design effects and dispersibility were measured as follows:

(1) Resistant to solvents

After drying the fibers (matting agent), the fibers were immersed in a mixed solvent composed of xylol, butanol, cyclohexane and butylcarbitol in the ratio of 40:15:15:30, and were kept at 50° C. for 300 hours. Thereafter, the loss of weight was measured.

(2) Luster

Into an aqueous emulsion paint composed mainly of an acrylic acid ester polymer and having a residue after heating of 50%, the matting agent of a prescribed quantity was dispersed uniformly, thereby to produce a sample paint. The paint was roll-painted in a thickness of about 25 μ on a galvanized steel plate of a thickness of 0.35 mm which was phosphate-treated in the usual way, roll-coated with an epoxy paint in a thickness of about 5 μ as the primer, and was subjected to a baking treatment. Thus a painted steel plate was produced. The luster of this steel plate was measured according to the 60 degree mirror surface reflectance (%).

(3) Resistance to weathering

A painted steel plate was produced in the same way as above except that a solvent-type polyester paint was used in place of the aqueous acrylic acid ester polymer emulsion paint. After 1000 hours of the sunshine weather meter test, the color difference (ΔE) was measured by a 307-type color analyzer produced by Hitachi Limited, using the iron plate before the test as the standard plate.

(4) Design effect

The twinkling effect of a painted steel plate produced in the same way as in the above-mentioned measurement of resistance to weathering, was judged visually.
O: a twinkling effect is observed.
Δ: some twinkling effect is observed.
X: no twinkling effect is observed.

(5) Adhesiveness:

A painted steel plate produced in the same way as in the abovementioned measurement of resistance to weathering, was wound around a rod of a radius of 5 mm, and the state of the film being peeled off was observed through a magnifying glass of 10 time magnification.
O: no peeling-off of the film occurs.
Δ: some peeling-off is observed.
X: remarkable peeling-off is observed.

(6) Dispersibility

The appearance of a painted steel plate produced in the same way as in the above-mentioned measurement of resistance to weathering, was judged visually.
O: the fibers are distributed uniformly.
Δ: some fiber masses are observed.
X: remarkable fiber masses are observed.

EXAMPLE 1

Fiber bundle Bonnel V 17 tow (5 d, fiber diameter: 25 μ) produced by Mitsubishi Rayon Company, Ltd., fiber bundle Cashimilon FK tow (10 d, fiber diameter: 35 μ) produced by Asahi Chemical Industry, Ltd., and fiber bundle Exlan F 150 tow (50 d, fiber diameter: 78 μ) produced by Japan Exlan Co., Ltd. were cut by means of a cutter produced by Matsushita Seiki Co., Ltd. into the fiber lengths shown in Table 1, and the cut fibers were added in the ratios (based on the net weight of the paints) shown in said Table and were dispersed uniformly, thereby to obtain matted paints.

TABLE 1

| Sample No. | Kind of fiber | Fiber diameter (μ) | Fiber length (mm) | Ratio of matting agent added (%) |
|---|---|---|---|---|
| 1 | Bonnel V 17 | 25 | 0.5 | 20 |
| 2 | " | " | 1.0 | " |
| 3 | " | " | 2.0 | " |
| 4 | Cashimilon FK | 35 | 0.5 | " |
| 5 | " | " | 1.0 | " |
| 6 | " | " | 2.0 | " |
| 7 | Exlan F 150 | 78 | 0.5 | 30 |
| 8 | " | " | " | 20 |
| 9 | " | " | " | 10 |
| C. Ex. | — | — | — | 0 |

C. Ex. = Comparative Example

The resistance to solvents of the matting agents used for the paints and the luster and the resistance to weathering of the painted films were evaluated and the results are shown in Table 2.

TABLE 2

| Sample No. | Resistance to solvents (%) | Luster (%) | Resistance to weathering |
|---|---|---|---|
| 1 | 0.3 | 6 | 0.9 |
| 2 | — | 9 | 0.9 |
| 3 | — | 10 | 1.3 |
| 4 | 0.2 | 8 | 1.1 |
| 5 | — | 12 | 1.2 |
| 6 | — | 11 | 1.4 |
| 7 | 0.3 | 10 | 0.8 |
| 8 | — | 13 | 1.9 |
| 9 | — | 16 | 2.8 |
| Comparative Example | — | 88 | 5.0 |

As shown in Table 2, the matting agents of the present invention showed a resistance to solvents having no problems in practical use and the painted films displayed a remarkable matted effect and resistance to weathering.

EXAMPLE 2

Twelve (12) parts of an AN polymer composed of 89.6% AN, 10.2% vinyl acetate and 0.2% sodium methallylsulfonate were dissolved in an aqueous 45% solution thiocyanate solution so as to form a spinning solution of a 12% polymer concentration. The solution was extruded into an aqueous 15% sodium thiocyanate solution to form coagulated fibers. The fibers were cold-stretched 2.5 times, washed with water, stretched 5 times in boiling water, subjected to a drying-compacting treatment (dry heat: 120° C., wet heat: 70° C.) and a relaxing wet heat treatment (135° C.), and stretched 1.4 times by means of a turbo-stapler to obtain fibers having a diameter of 12.1 μ.

After cutting the fibers into a fiber length of 0.35 mm, the fibers were shrunk under the conditions shown in Table 3 to obtain matting agents.

TABLE 3

| Sample No. | Shrinking conditions | Fiber length (mm) | Fiber diameter (μ) | Aspect ratio |
|---|---|---|---|---|
| 10 | Non-treated | 0.35 | 12.1 | 28.9 |
| 11 | 20 minutes in boiling water | 0.28 | 13.5 | 20.7 |
| 12 | 30 minutes in boiling water | 0.25 | 14.3 | 17.5 |
| 13 | 15 minutes in steam of 120° C. | 0.21 | 15.6 | 13.5 |

The matting agents were added in the ratio of 20% based on the net weight of the paints respectively and were dispersed to obtain matted paints. The resistance to solvents of the matting agents used for the paints and the luster and the resistance to weathering of the painted films were evaluated, and the results are shown in Table 4.

TABLE 4

| Sample No. | Resistance to solvents (%) | Luster (%) | Resistance to weathering |
|---|---|---|---|
| 10 | 0.3 | 13 | 1.1 |
| 11 | — | 13 | 1.3 |
| 12 | — | 11 | 1.1 |
| 13 | — | 10 | 1.5 |

As shown in Table 4, Sample Nos. 10–13 showed results of no problems in practical use as to the resistance to solvents, the luster and the resistance to weathering. But while Samples Nos. 12–13 satisfying the recommended ranges of the present invention in the fiber length, fiber diameter and aspect ratio, gave uniform painted films, Sample No. 10 whose fiber length and aspect ratio were outside said ranges and Sample No. 11 whose aspect ratio was outside said range, did not give uniform painted films, with speckled unevenness having occurred here and there in the painted films.

EXAMPLE 3

In the same way as in Example 2, fibers having a diameter of 32 µ were obtained. After cutting said fibers into a length of 0.35 mm, the fibers were shrunk under the conditions shown in Table 5, and thus matting agents were obtained.

TABLE 5

| Sample No. | Shrinking conditions | Fiber length (mm) | Fiber diameter (µ) | Aspect ratio |
|---|---|---|---|---|
| 14 | 5 minutes in boiling water | 0.32 | 33.5 | 9.6 |
| 15 | 15 minutes in steam of 120° C. | 0.20 | 42.3 | 4.7 |

Using said matting agents and in the same way as in Example 2 matted paints were produced. Table 6 shows the results of evaluation of the luster and the resistance to weathering of the films painted with said paints.

TABLE 6

| Sample No. | Luster | Resistance to weathering |
|---|---|---|
| 14 | 13 | 1.3 |
| 15 | 7 | 1.0 |

As shown in Table 6, there were no problems in respect of the luster and the resistance to weathering, but Sample No. 14 had stripe scratched in the painted films. Example 4

Twelve (12) parts of an AN polymer composed of 85% AN, 14.8% methyl acrylate and 0.2% sodium methallylsulfonate were dissolved into an aqueous 45% sodium thiocyanate solution so as to form a spinning solution of a 12% polymer concentration. The solution was extruded into an aqueous 15% sodium thiocyanate solution to form coagulated fibers. The fibers were stretched 2.5 times, washed with water, stretched 5 times in boiling water, subjected to a relaxing wet heat treatment (128° C.) and to a secondary stretching of 1.3 times by means of a turbo-stapler so as to obtain fibers having a diameter of 25 µ.

After cutting the fibers into a length of 0.3 mm, the cut fibers were shrunk under the conditions shown in Table 7 to obtain matting agents.

TABLE 7

| Sample No. | Shrinking conditions diameter | Fiber length (mm) | Fiber diameter (µ) | Aspect ratio |
|---|---|---|---|---|
| 16 | 15 minutes in boiling water | 0.25 | 27.4 | 9.1 |
| 17 | 15 minutes in steam of 120° C. | 0.18 | 32.3 | 5.6 |

Using the matting agents and in the same way as in Example 2, matted paints were obtained. Table 8 shows the results of evaluation of the resistance to solvents of the matting agents and the luster and the resistance to weathering of the paints.

TABLE 8

| Sample No. | Resistance to solvents (%) | Luster (%) | Resistance to weathering |
|---|---|---|---|
| 16 | 0.3 | 9 | 0.9 |
| 17 | — | 6 | 1.1 |

As shown in Table 8, there were not problems in respect of the resistance to solvents of the matting agents, the luster and the resistance to weathering of the painted films, and uniform painted films were obtained. Also there were no difficulties in the painting operation.

EXAMPLE 5

Methacrylic acid, acrylamide or methyl acrylate was used as the monomer for the copolymerization with AN. Five kinds of AN polymers were produced by changing the kinds and the copolymerization quantities of the monomer. Each of the polymers was spun in the usual way, and acrylic fibers of a circular section (fiber diameter: 25 µ, application quantity of a nonionic oiling agent: 0.7%) were produced. The fibers were then cut into a fiber length of 0.15 mm by means of a cutter produced by Matsushita Seiki Co., Ltd. Thus 5 kinds of sample fibers (each having a resistance to solvents of 0.3%) were obtained.

Various properties of the paints (to which 20% sample fibers were added based on the net weight of the paints) were evaluated. The results are shown in Table 9 below:

TABLE 9

| No. | Kind of functional groups | Content of functional groups (%) | Luster (%) | Resistance to weathering | Adhesiveness |
|---|---|---|---|---|---|
| 18 | —COOH | 2 | 9 | 0.9 | O |
| 19 | " | 5 | 11 | 1.1 | O |
| 20 | —CONH$_2$ | 2 | 10 | 1.2 | O |
| 21 | " | 5 | 9 | 1.0 | O |
| 22 | — | — | 10 | 1.0 | Δ |

It is clearly understood from the above Table that the products of the present invention (Nos. 18–21) containing the prescribed functional groups have improved adhesiveness, while retaining the other properties.

EXAMPLE 6

Three kinds of sample fibers were produced in the same way as in Examples 5-18 except that the cross-sectional shape of the fibers were changed as shown in Table 10 below.

The results of evaluation of the design effect are shown together in Table 10.

TABLE 10

| No. | Cross-sectional shape | Design effects |
| --- | --- | --- |
| 23 | Triangle | O |
| 24 | Flat shape | O |
| 25 | Cocoon shape | O |
| 18 | Circular shape | Δ |

As apparent from the above Table, non-circular shapes were better than circular shape in imparting design effect (twinkling effect).

EXAMPLE 7

Three kinds of sample fibers were produced in the same way as in Examples 5-18 except that the quantity of application of the oiling agent was changed.

The results of evaluation of the dispersibility are shown in Table 11.

TABLE 11

| No. | Quantity of application of the oiling agent (%) | Dispersibility |
| --- | --- | --- |
| 26 | 0.05 | Δ |
| 27 | 0.2 | O |
| 28 | 1.0 | O |

It is understood from the above Table that the dispersibility is improved by applying the oiling agent in a quantity in the range recommended in the present invention.

What is claimed is:

1. A matting agent produced from fibers of a polymer containing acrylonitrile in a quantity more than 50 weight %, said fibers having a fiber diameter less than $100\mu$, a fiber length less than 0.3 mm, an aspect ratio less than 20, and a non-circular cross-sectional shape.

2. The matting agent as claimed in claim 1 wherein the fibers contain a functional group having active hydrogen.

3. The matting agent as claimed in claim 2 wherein the content of the functional group having active hydrogen is 0.2–10% based on the weight of the fibers.

4. The matting agent as claimed in claim 1 wherein the fibers are applied with an oiling agent on the fiber surface.

5. A paint in which the matting agent as claimed in claim 1 is compounded in a quantity of 1 to 50 weight % based on the net weight of the paint.

* * * * *